United States Patent
Lyngbäck et al.

(10) Patent No.: US 11,718,509 B2
(45) Date of Patent: Aug. 8, 2023

(54) VEHICLE COMPRISING A WORKING EQUIPMENT, AND A WORKING EQUIPMENT, AND A METHOD IN RELATION THERETO

(71) Applicant: Hiab AB, Kista (SE)

(72) Inventors: Hans Lyngbäck, Hudiksvall (SE); Per Gustafsson, Hudiksvall (SE); Muhammad Imran, Sundsvall (SE)

(73) Assignee: HIAB AB, Kista (SE)

( * ) Notice: Subject to any disclaimer, the term of this patent is extended or adjusted under 35 U.S.C. 154(b) by 511 days.

(21) Appl. No.: 16/839,218

(22) Filed: Apr. 3, 2020

(65) Prior Publication Data
US 2020/0317477 A1    Oct. 8, 2020

(30) Foreign Application Priority Data
Apr. 5, 2019    (SE) .................................. 1950427-3

(51) Int. Cl.
 *B66C 13/48*    (2006.01)
 *G05D 1/00*    (2006.01)
 (Continued)

(52) U.S. Cl.
 CPC ........... *B66C 13/48* (2013.01); *G05D 1/0094* (2013.01); *G06V 20/56* (2022.01); *B66C 2700/08* (2013.01)

(58) Field of Classification Search
 CPC .............................. B65G 67/04; B66C 13/48
 See application file for complete search history.

(56) References Cited

U.S. PATENT DOCUMENTS

| | | |
|---|---|---|
| 2008/0024608 A1 | 1/2008 | Hahn et al. |
| 2016/0075281 A1 | 3/2016 | Singh et al. |

(Continued)

FOREIGN PATENT DOCUMENTS

| | | |
|---|---|---|
| DE | 299 04 800 U1 | 6/1999 |
| DE | 103 50 923 A1 | 5/2005 |

(Continued)

OTHER PUBLICATIONS

Swedish Search Report for corresponding Swedish Patent Application No. 1950427-3 dated Sep. 18, 2019.

*Primary Examiner* — Russell Frejd
*Assistant Examiner* — Sara J Lewandroski
(74) *Attorney, Agent, or Firm* — Renner, Otto, Boisseile & Sklar

(57) ABSTRACT

A vehicle (2) comprising a working equipment (4) equipped with a movable loading arrangement (5) comprising a first attachment member (7), said vehicle further comprises a sensor system (6) configured to capture environmental data reflecting the environment around the vehicle and to determine, based on said data, image data (8) representing an area at least partly surrounding the vehicle (2).

The sensor system (6) is configured to detect and track positions of the first attachment member (7) and a mating second attachment member (9) of the object (20) to load in said image data representation, and, the detected and tracked positions of the first and second attachment members (7, 9) are used to generate a first set of operation instructions for the loading arrangement (5) of the working equipment that decreases the distance between said first and second attachment members such that said attachment members (7, 9) come into position to engage to each other. The control unit 16 is configured to verify that said attachment members (7, 9) are engaged based on the detected and tracked positions from the sensor system (6), and in response to verifying that (Continued)

```
┌─────────────────────────────────────┐
│ DETERMINING THAT VEHICLE HAS        │
│ REACHED A TARGET POSITION IN        │
│ RELATION TO AN OBJECT TO LOAD       │
└─────────────────────────────────────┘
                  │
                  ▼
┌─────────────────────────────────────┐
│ ENABLING ACTIVATION OF ATTACHEMENT  │
│ MODE COMPRISING DETECTING AND       │
│ TRACKING POSITIONS OF FIRST AND SECOND │
│ ATTACHMENT MEMBERS AND GENERATING   │
│ FIRST SET OF OPERATION INSTRUCTIONS TO │
│ DECREASE DISTANCE BETWEEN MEMBERS   │
│ SUCH THAT MEMBERS IN POSITION TO    │
│ ENGAGE TO EACH OTHER                │
└─────────────────────────────────────┘
                  │
                  ▼
┌─────────────────────────────────────┐
│ VERIFYING THAT ATTACHMENT MEMBERS   │
│ ARE ENGAGED AND ENABLING ACTIVATION │
│ OF OBJECT LOADING MODE TO MOVE      │
│ LOADING ARRANGEMENT SO THAT OBJECT  │
│ IS LOADED ON VEHICLE                │
└─────────────────────────────────────┘
``` said attachment members (7, 9) are engaged, enable activation of an object loading mode in which the control system generates a second set of operation instructions for the working equipment to move the loading arrangement (5) so that the object to load is loaded on the vehicle.

13 Claims, 3 Drawing Sheets

(51) Int. Cl.
    *G06K 9/00*     (2022.01)
    *G06V 20/56*     (2022.01)

(56) References Cited

U.S. PATENT DOCUMENTS

| | | |
|---|---|---|
| 2016/0378118 A1 | 12/2016 | Zeng et al. |
| 2017/0369101 A1 | 12/2017 | Sommer et al. |
| 2018/0039278 A1 | 2/2018 | Hüger et al. |
| 2018/0329425 A1* | 11/2018 | Watts ................. B66F 9/0755 |
| 2019/0094872 A1 | 3/2019 | Li et al. |

FOREIGN PATENT DOCUMENTS

| | | |
|---|---|---|
| DE | 10 2004 041 938 A1 | 3/2006 |
| WO | 2018/055321 A2 | 3/2018 |
| WO | 2018/160119 A1 | 9/2018 |

\* cited by examiner

VEHICLE COMPRISING A WORKING EQUIPMENT, AND A WORKING EQUIPMENT, AND A METHOD IN RELATION THERETO

This application claims priority to Swedish Patent Application No. 1950427-3 filed on Apr. 5, 2019, which is hereby incorporated herein by reference.

TECHNICAL FIELD

The present disclosure relates to a vehicle comprising a working equipment, e.g. a loader crane or a hook-lift, and to a working equipment structured to be mounted on a vehicle. The disclosure also relates to a method in relation to the vehicle, or the working equipment.

BACKGROUND

A vehicle may be equipped with different working equipment, such as a loader crane or a hook-lift (also called a demountable), to perform certain working tasks.

With a hook-lift mounted on a vehicle, such as a truck, the vehicle may load and unload objects like flatbeds, dumpster bodies, and similar containers. Various applications within waste-handling, recycling, scrap and demolition industries are then available.

Another example of a vehicle equipped with a working equipment is a truck with a crane, e.g., a loader crane or a forest crane. As the working equipment is mounted on a movable vehicle, the position and direction of the working equipment relative the object of the working procedure is depending on the position and sometimes also the direction of the vehicle. In order to achieve a viable, or optimal workflow, for the working equipment the vehicle position relative to the object (and also the surrounding) often needs to be adjusted. Today this is managed by the driver of the vehicle, and it is the experience and knowledge of the driver that determines the success and safety of the work that is performed by the vehicle and working equipment. Other factors such as the time spent on a working task and the wear and tear of the working equipment is also affected by the driver's choices during a working assignment.

The present disclosure is focused on how to enable autonomous, or semi-autonomous (the system generates driving instructions to aid the driver), handling of an object by a vehicle using a working equipment, and in particular on how to generate operation instructions for moving towards a target in the surrounding of the object to be handled, and how to perform a loading procedure. For example; when loading on a flatbed on a truck, the truck needs to be aligned with the flatbed and in order to get in that position the truck normally needs to move in a straight line towards the flatbed at least at the final distance. A target may hence be a position located at a predetermined distance from the attachment means of the flatbed so that the truck may move in a straight line towards the flatbed from the target point.

In the following some documents within the same technical field as the present disclosure will be presented and briefly discussed.

US20170369101 discloses a maneuvering system for maneuvering a predetermined part of a vehicle into a target position provided by a target object. A first optical sensor arranged at the vehicle captures the target object and a trajectory is calculated. A second optical sensor arranged at a different position on the vehicle also captures the target object. The image from the second optical sensor can be used to refine the trajectory or can be used independently if e.g. the first sensor fails.

US20160378118 discloses a method for autonomously aligning a tow hitch ball on a towing vehicle and a drawbar on a trailer. The drawbar is identified as the target and a template pattern around the drawbar is created. The method predicts a new location of the target as the vehicle moves and identifies the target in new images as the vehicle moves by comparing the previous template pattern with an image patch around the predicted location.

US20160075281 discloses a vehicle hitch assistance system to align a tow hitch mounted on the vehicle with a trailer coupling mounted to a trailer. The hitch assistance system comprises an imaging system that is provided to generate image data to identify obstructions proximal to the vehicle and/or to the trailer. Further, the imaging system together with a processor is used to capture and analyze image data of the trailer coupling (target) to guide the vehicle towards the trailer coupling by modifying a steering guidance signal, i.e. the steering wheel angle.

DE10350923 discloses a method for reversing a vehicle with a trailer to a position beneath a target object, i.e. a support frame for a container. The path is determined after the target object is detected by a captured image.

US20180039278 discloses an iterative method for detecting a target and determining the travel path, wherein the target position and the object position are coordinated with one another. The iterative method makes it possible to introduce every point in time during the traveling along the travel path, such that parameters can be adapted to varying ambient conditions and/or more accurate knowledge by the camera and/or the vehicle position.

US20080024608 discloses a method for visualizing the surroundings of a vehicle to the driver, wherein the image output to the driver is adapted depending on e.g. current weather.

The present disclosure is in particular focused on how to enable autonomous, or semi-autonomous (comprising generating instructions to aid the driver), loading of an object on a vehicle using a working equipment.

A more general object of the present invention is to achieve an improved vehicle, working equipment, and method where the improvement lies in that the safety of the work performed by the vehicle and working equipment is less dependent upon the experience and knowledge of the driver, and in particular to achieve an improved vehicle and method where parameters of the surroundings around the vehicle, and of the vehicle, are taken into account when controlling the vehicle, and in particular with regard to the final stages of a loading procedure.

SUMMARY

The above-mentioned object is achieved by the present invention according to the independent claims.

Preferred embodiments are set forth in the dependent claims.

A vehicle according to the present invention will achieve an improved capability when moving towards an object, and specifically to perform the loading procedure. Preferably, this is achieved by taken into account numerous external parameters and also internal vehicle related parameters in order to determine a path for the vehicle to follow towards the object, and to control the vehicle to follow the path. Thus, the present invention provides a technique to safely control the vehicle taken numerous parameters into account, which is particularly advantageous if the vehicle is an autonomous or semi-autonomous vehicle. The technique also provides an improved accuracy in the determined operation instructions, which increases the safety of the driving process.

Several embodiments discussed herein in relation to the vehicle are applicable also in relation to the working equipment. Further, by having such functionality in the working equipment it implies that a working vehicle may be adapted to a specialized type of working assignments by adding the working equipment for it.

DETAILED DESCRIPTION

The vehicle, the working equipment, and the method in relation to the vehicle/working equipment, will now be described in detail with references to the appended figures. Throughout the figures the same, or similar, items have the same reference signs. Moreover, the items and the figures are not necessarily to scale, emphasis instead being placed upon illustrating the principles of the invention.

Figure 1:
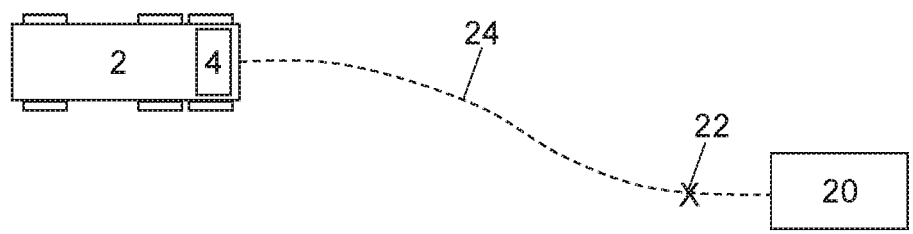
FIG. 1 is an overview illustration schematically illustrating a vehicle according to the present invention.

The basis for the present invention is a system approach to the vehicle and working equipment (together forming a working unit). This is schematically illustrated in FIG. 1 where a vehicle 2, provided with a working equipment 4, moves along a path 24 towards a target position 22 close to an object 20 to be loaded onto the vehicle.

The control systems of the vehicle and the working equipment are connected using a machine to machine (M2M) connection, such as CAN.

Measurements from sensors detecting moving and non-moving objects, including an object to be loaded, in the environment of the vehicle are important for the system. Examples of such sensors are LIDAR, 3D Cam, Cameras, Lasers, thermal camera. Common for these type of sensors is that they image or describe the surroundings with image data. Image data in this aspect being data organized in a matrix to describe the spatial relationship of the surrounding with respect to What the sensors are measuring. The sensors may be mounted to the vehicle and/or the working unit and are connected to the control systems.

When loading an object on a working unit, comprising a vehicle and a working equipment a first set of image data is first captured. The image data is typically describing an area partly surrounding the working unit and is captured with a first sensor unit mounted on the working unit. As described earlier the definition of image data is broad, and covering visual images, video data, thermal images, LIDAR and radar data etc. Spatial features of objects in the area are extracted by analyzing the captured first set of image data and objects for loading can hence be detected. For example, the system can be set up to detect recycling bins or various types of containers, flatbeds or other types of compartments or receptacles for carrying or containing load during transport.

Figure 2:
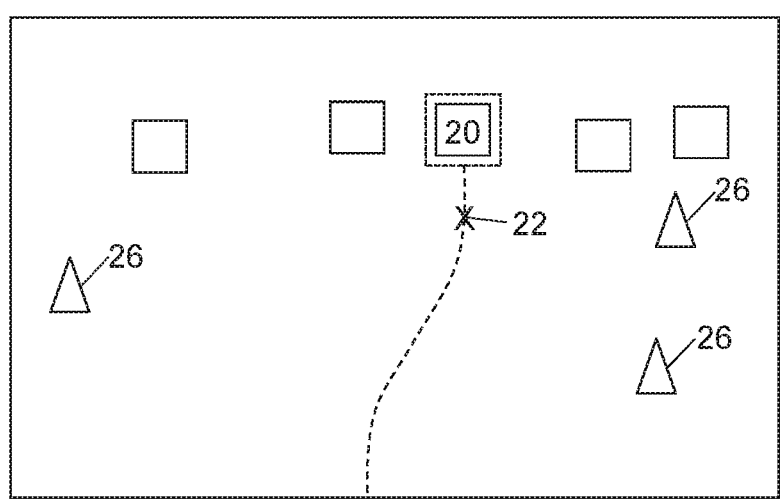
FIG. 2 is a schematic illustration of a view based on data from the sensor system of an embodiment of the vehicle according to the present invention.
Figure 3:
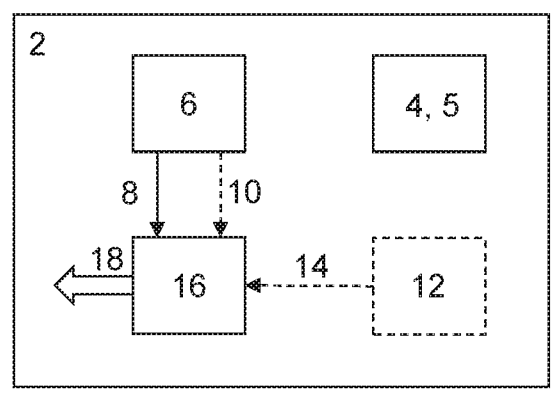
FIG. 3 is block diagram schematically illustrating the vehicle according to the present invention.

A target class of the detected object for loading can then be further deduced by comparing the extracted spatial features in the captured image data to spatial features of predetermined target classes to be loaded, e.g. a particular type of container being marked in a certain way, having a particular color or a construction. Depending on the type of target the system would also be able to deduce the type of attachment member and further the height from the ground that the attachment member is placed on the target. In FIG. 2 a number of objects are shown where one object 20 should be loaded onto the vehicle. Also a number of reference objects 26 are shown.

A first stage of the loading is then initiated in response to identifying the target class of the detected object for loading. In this stage the position of the detected object is estimated in relation to the working unit by comparing spatial features of the detected object in the captured set of image data to corresponding spatial features of objects in the identified target class of objects. A set of operation instructions, herein denoted a third set of operation instructions, for moving the vehicle towards the estimated position of the detected object is then generated.

In response to receiving a signal corresponding to the working unit being in close proximity of the detected object a second stage of the loading is entered. This signal may be received from a second sensor unit mounted on the working unit further being arranged to capture sets of image data from the surrounding of the working unit or from control system when it is determined that the vehicle has reached the target position.

The present invention relates particularly to the second and third stages of the loading procedure that corresponds to an attachment mode and to an object loading mode, respectively, which will be further discussed in the following.

Sensor data from the first and the second sensor unit is then used to detect and track the position of an attachment member of the detected object for loading in relation to an attachment member of the working equipment in three dimensions by mapping sets of image data from the first and second sensor unit to a common coordinate system. This may be implemented using a first and a second sensor unit placed on different locations on the working equipment and vehicle. The sensor system may then map the received sensor data from the two sensor units to a common 3d coordinate system.

A first set of operation instructions, for the vehicle and working equipment, is generated based on the detected and tracked positions of the attachment member of the detected object for loading in relation to the attachment member of the working equipment. These operation instructions aim to move the working unit such that the attachment member of the working equipment is engaged with the attachment member of the detected object for loading. This is achieved by positioning the attachment members of the working equipment by moving e.g. the hooklift or crane booms (i.e. the loading arrangement) and/or the vehicle.

A third and final stage of the loading is then to be initiated when the engagement of the attachment members in the common coordinate system has been verified. During this stage, a second set of operation instructions, for the working equipment is generated to transfer the object to be loaded to the vehicle.

With reference to FIGS. 1-5 a vehicle 2 comprising a working equipment 4 is provided. The working equipment is equipped with a movable loading arrangement 5 comprising a first attachment member 7, see FIG. 5.

The vehicle may be equipped with different working equipment, such as a loader crane or a hook-lift (also called a demountable), to perform certain working tasks.

With a hook-lift mounted on a vehicle, the vehicle may load and unload objects like flatbeds, dumpster bodies, and similar containers. Various applications within waste-handling, recycling, scrap and demolition industries are then available. Another example of a vehicle equipped with a working equipment is a truck with a crane e.g. a loader crane or a forest crane. The vehicle may be an autonomous vehicle, or a semi-autonomous vehicle. A semi-autonomous vehicle is a vehicle where an operator to a certain degree is involved in the operation of the vehicle, e.g. the operator receives operating instructions via an interface, e.g. a graphical user interface or via computer generated audial or tactile instructions.

The vehicle comprises a sensor system 6 configured to capture environmental data reflecting the environment around the vehicle and to determine, based on the data, image data 8 representing an area at least partly surrounding the vehicle 2, and optionally, ambient condition data 10.

The vehicle may further comprise a vehicle data unit 12 configured to determine vehicle data 14 representing characteristics of the vehicle 2.

Furthermore, the vehicle also comprises a control unit 16 configured to receive the image data 8, and optionally the vehicle data. 14, and the ambient condition data. 10, and to determine and generate control signals 18 for controlling the vehicle 2, wherein the control signals 18 comprise operation instructions.

The control unit is provided with a communication interface and is connected to a common data bus, e.g. a CAN bus, and is configured to perform bidirectional communication, e.g. comprising sensor signals, to other units. Further protocols based on CAN may be applied, like application layer protocols such as SAE J1939 for in-vehicle networks for buses and trucks may further be used for the communication. As an alternative various protocols based on Ethernet and similar standards may be used such as Broad R Reach. Within a system with working units mounted on a vehicle various communication protocols may be used in different parts of the system.

The control unit is configured to determine control signals 18 for controlling various devices and means required to operate the vehicle and working equipment, and the control unit disclosed herein comprises the necessary processing capacity to perform its intended task and comprises necessary data storage capabilities, and communication capabilities to support the task. The control unit may comprise distributed processing entities, and it is provided with the necessary processing capacity to perform all tasks discussed herein in relation to the vehicle. The control unit may be decentralized, i.e. divided into several sub-control units, and is provided with one or many memory units. It is also provided with communication capabilities, both via physical connections and/or wireless connections.

The control unit 16 is configured to receive a working task to be performed by the vehicle, wherein the working task includes information of an object 20 for the vehicle 2 to load when performing said working task. As discussed above, the object 20 may be flatbeds, dumpster bodies, and similar containers. A working task may include information regarding where a specific object is located, the type of object, what to do with the object, and where to transport the object.

Figure 5:
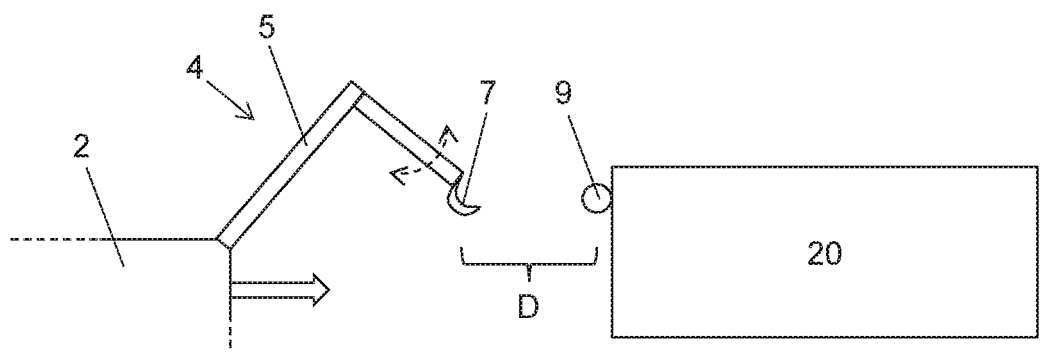
FIG. 5 is a schematic drawing illustrating a vehicle provided with a working equipment according to the present invention.

The control unit 16 is configured to determine that the vehicle has reached a target position 22, being a position based on the location of the object 20 to load when performing the working task, using said image data representation from the sensor system. In response to determining that the vehicle has reached the target position the control unit is configured to enable activation of an attachment mode of the working equipment. In the attachment mode the sensor system 6 is configured to detect and track positions of the first attachment member 7 and a mating second attachment member 9 of the object 2C) to load in the image data representation. The detected and tracked positions of the first and second attachment members 7, 9 are used to generate a first set of operation instructions for the loading arrangement 5 of the working equipment that decreases the distance D (see FIG. 5) between said first and second attachment members such that said attachment members 7, 9 come into position to engage to each other. This is schematically illustrated in FIG. 5 where arrows indicate three dimensional movements of the vehicle and/or the working equipment.

When the distance D approaches zero the control unit is configured to verify that the attachment members 7, 9 are engaged based on the detected and tracked positions from the sensor system 6. In response to verifying that the attachment members 7, 9 are engaged, enable activation of an object loading mode in which the control system generates a second set of operation instructions for the working equipment to move the loading arrangement 5 so that the object to load is loaded on the vehicle.

According to one embodiment the sensor system comprises a first and a second sensor unit placed on different locations on the working equipment and vehicle, and wherein image data from said first and the second sensor units is used to detect and track the position of said first attachment member in relation to said second attachment member in three dimensions by mapping sets of image data from the first and second sensor unit to a common three-dimensional coordinate system.

According to another embodiment the movable loading arrangement is a hooklift loading arm (see FIG. 5), or a crane arm (with one or more booms), and wherein said first attachment member 7 comprises a hook (see FIG. 5), grip or fork.

As discussed above, the sensor system 6 comprises one or many of radar, LIDAR, 3D cameras, cameras, lasers, thermal cameras, and wherein the image data being data organized in a matrix to describe the spatial relationship of the surrounding with respect to what said sensor system 6 is measuring.

According to a further embodiment, and in order for the vehicle to reach the target position 22, the control unit is configured to identify an object for loading and estimate the position of the identified object in relation to the vehicle by comparing spatial features of objects in the captured set of image data to corresponding spatial features of an object for the vehicle to load according to said working task. The control unit is then configured to determine and generate a third set of operation instructions for moving the vehicle towards the estimated position of the detected object. This embodiment will be further described below in relation to determining a path 24.

According to still another embodiment the vehicle comprises a vehicle data unit 12 configured to determine vehicle data 14 representing characteristics of the vehicle 2. The control unit 16 is also configured to receive the vehicle data 14, and wherein the vehicle data. 14 comprises one or many of: the number of wheels in contact with the ground, the location of wheels in contact with the ground relative to the vehicle, the weight of the vehicle, the center of mass of the vehicle, and the type of tires, and wherein the vehicle data is applied to determine said third set of operation instructions.

More particularly, the control unit 16 is configured to:
determine a target position 22 (marked with an X in FIGS. 1 and 2), being a position based on the location of the object 20 to reach when performing the working task in the image data representation, in relation to the vehicle 2,
calculate at least a first path 24 from the vehicle 2 to the target position 22 by applying a set of path calculation rules,
determine the third set of operation instructions such that the vehicle 2 is controlled to follow the at least first path 24, wherein the operation instructions are determined in dependence of the image data 8, vehicle data 14, and optionally ambient condition data 10, by applying a set of path following rules.

The at least first path is a trajectory along which the vehicle could move to the target position. In the figure only one path is shown. However, it is possible to calculate a number of different paths and present the different paths to an operator that may choose one of the paths.

The target position may be the position of the object or may be a position located a predetermined distance from the location of the object for the vehicle to reach when performing said working task. The target position may be dependent upon the type of working equipment. If e.g. the working equipment is a hook-lift the position of the hook at the vehicle in relation to a connection bar at a container to be handled, may be used to determine the target position. A target position may also be a position beside the object which would be the case if the object is a bin and the working equipment is a lifting arrangement such as a crane or another type of lifting arrangement at one side of the vehicle.

According to one refinement the control unit is configured to determine third operation instructions such that the vehicle 2 is controlled to follow the at least first path 24, wherein the driving instructions are determined in dependence of the image data 8, ambient condition data 10, and vehicle data 14, by applying a set of path following rules.

In one variation the ambient condition data 10 comprises at least a ground surface parameter, e.g. a friction value, of the ground surface at the current position of the vehicle 2, and wherein one path following rule comprises using said ground surface parameter. The ground surface parameter is measured by a dedicated sensor included in the sensor system in one variation a contactless friction sensor may be used, in another variation a combination between signals from optical sensors and temperature sensors may be used.

In a further example the control unit 16 is configured to repeatedly determine the target position 22, calculate at least the first path 24, and determine the third operation instructions, until the vehicle 2 has reached the target position 22.

Based on the location of the object in relation to the current position of the vehicle a path towards the object may be generated. A number of possible paths may guide the vehicle towards the object and one that fits the characteristics of the vehicle, and the object to be loaded may be chosen.

According to a further embodiment the control unit 16 is configured to identify at least one reference point 26 in the image data representation.

FIG. 2 illustrates an example of an image data representation where three reference points 26 are shown. In addition five possible objects are shown where one object 20 is the object intended to be handled. This object is indicated by a dashed square around the object. Example objects may be of same type, e.g. flatracks, all identified by the sensor system. One object may then be selected by e.g. an operator (which is an example of a working instruction). Or by further identifying a specific object and matching to a working instruction. Any object of an object type may be a working instruction as well as a selection of a specific object.

The at least one reference point 26 represents a fixed object in the environment surrounding the vehicle 2 that is easy to identify, and not being the object 20 for the vehicle 2 to reach. The at least one reference point 26 is applied when calculating the at least one first path 24, and identified and applied during movement along the at least one first path 24 in order to follow the at least one first path 24. Using one or many reference points improves the accuracy in following the first path, in that the reference point is used to determine the resulting motion of the driving instructions to be able to fine-tune the next set of driving instructions. In particular, using one or many reference points not being the target object has the following advantages:

Separate reference point(s) will improve the accuracy as an additional point.
Reference point(s) may be selected as an object that is easily detected and measured distance to, specifically in directions that differ from the moving direction of the vehicle.
If the reference point(s) is/are located at closer distance accuracy is improved.

In a example the control unit 16 is configured to determine the location of the object 20 for the vehicle 2 to reach when performing the working task in the image data representation, either as a result of manual input of an operator, or through an image analysis. A manual input of an operator may be performed by pointing at an object to be handled on a touch screen showing the image data representation where the object, e.g. among a plurality of objects, is shown.

If an image analysis is performed the control unit is configured to detect candidate objects, and (optionally) further to identify a particular object, and (optionally) using object type information included in the received working task.

The sensor system 6 comprises one or many of radar, LIDAR, 3D cameras, cameras, lasers, thermal cameras, or any other sensing device capable of capturing information reflecting the surroundings around the vehicle. The image data being data organized in a matrix to describe the spatial relationship of the surrounding with respect to what the sensor system 6 is measuring. The various sensor units of the sensor system may be used for various applications and may in addition to a sensor component comprise additional hardware and software for analysing measurements performed or samples gathered by the sensor component. The image data 8, may hence comprise measurement values, and results of analysis of measurement values on various complexity levels. A 3D camera may for example generate a sensor signal corresponding to an object identified as an object to be loaded and the coordinates of this object, whereas a laser unit may generate a sensor signal corresponding to a distance to an object in a predetermined direction. As a further example a sensor unit may be a sensor for reading information coded in RFID tags, bar codes, QR-codes or other similar codes or tags. An object to be loaded may e.g. be marked with such a tag describing the ID of the object, the weight of the object etc.

The vehicle data 14 describes the current characteristics of the vehicle and comprises one or many of the number of wheels in contact with the ground, the location of wheels in contact with the ground relative to the vehicle, the weight of the vehicle, which may be the total weight including load, the center of mass of the vehicle, and the type of tires. The vehicle data unit comprises various sensors for gathering information about the current state of the vehicle. These various sensors may be temperature sensors, sensors for estimating the weight of the vehicle, the center of mass of the vehicle, etc.

The set of path following rules comprises rules related to the movement of the vehicle along the path, related to e.g. the steering angle of the steering wheels, and then including steering angle limitations; the vehicle velocity including vehicle velocity limitations, the orientation of the vehicle along the path and in particular when approaching the object, etc.

The third operation instructions may include at least a steering angle to the steering wheels of the vehicle 2 to be applied to the vehicle steering actuators, or instructions to a driver to perform a steering activity. The operation instructions may also include a vehicle velocity parameter, including a velocity and also a direction of movement. Thus, an operation instruction may be an instruction for any type of movement of the vehicle, or sequence of movements. It may be for driving the vehicle in forward direction or in reverse. More particularly, a velocity or direction of the vehicle is achieved by generating driving instructions including turning the steering wheel more/less to the left or right. The path following rules are used to get information about how the vehicle should move to reach the target. The driving instructions are then about how to make the vehicle move accordingly. So the vehicle characteristics and the ambient conditions affect the operation instructions. The third operation instructions could be relative, i.e. increase/decrease a steering angle, or absolute i.e. this parameter should be set to that value.

A third operation instruction may be visualized in different ways on a display for an operator in a semi-autonomous mode.

The operation instruction that is generated to guide the vehicle towards the target comprises at least a steering angle. By also identifying reference points in the image data representation the reaction of a first driving instruction may be deduced from subsequently captured image representations and used as input to adapt a second driving instruction and further, optionally, the path towards the target.

By storing the received vehicle data together with extracted data describing a change in position of the vehicle due to the first driving instruction, the relationship may later be used to generate or adapt a third driving instruction. This type of data and relationship between the data may hence be used as training data for a neural network.

The set of path calculation rules comprises calculation rules required to obtain a path for the vehicle to follow from its present position to the object. The set of rules may comprise rules related the distance to the object, and various vehicle parameters, e.g. the length, the weight, the steering radius, and the orientation of the vehicle. In order to calculate the at least one path a library of stored paths may be applied based upon previously applied paths. Among the stored paths one may be chosen being one that fits the present situation the best—the chosen path may then be adapted to the present situation.

Figure 4:
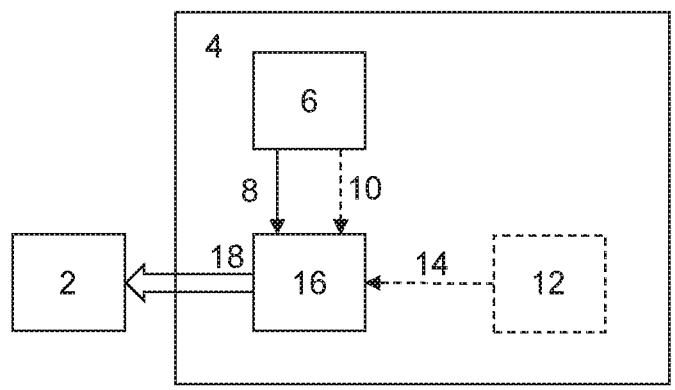
FIG. 4 is block diagram schematically illustrating the working equipment according to the present invention.

With references to the block diagram illustrated in FIG. 4 the present invention also relates to a working equipment 4 structured to be mounted on a vehicle 2. Various types of working equipment has been exemplified above. The working equipment is equipped with a movable loading arrangement 5 comprising a first attachment member 7 (see FIG. 5).

The working equipment comprises a sensor system 6 configured to capture environmental data reflecting the environment around the working equipment and vehicle when mounted on the vehicle, and to determine, based on said data, image data 8 representing an area at least partly surrounding the working equipment and the vehicle 2. The sensor system comprises one or many sensors which has been exemplified above in relation to the description of the vehicle. The one or many sensors may be mounted at the working equipment and/or at the vehicle.

The working equipment further comprises a control unit 16 configured to receive the image data 8, and to determine and generate control signals 18 for controlling the vehicle 2 and working equipment, wherein the control signals 18 comprise operation instructions. The control unit 16 is configured to receive a working task to be performed by the working equipment when mounted on the vehicle, wherein said working task includes information of an object 20 for the vehicle 2 to load when performing the working task. The control unit 16 is configured to:

determine that the vehicle has reached a target position 22, being a position based on the location of the object 20 to load when performing the working task, using said image data representation from the sensor system, in response to determining that the vehicle has reached the target position enable activation of an attachment mode of the working equipment in which:

the sensor system 6 is configured to detect and track positions of the first attachment member 7 and a mating second attachment member 9 of the object to load in the image data representation, and, the detected and tracked positions of the first and second attachment members 7, 9 are used to generate a first set of operation instructions for the loading arrangement 5 of the working equipment that decreases the distance between the first and second attachment members 7, 9 such that the attachment members come into position to engage to each other.

When the distance is determined to be zero the control unit is configured to verify that the attachment members 7, 9 are engaged based on the detected and tracked positions from the sensor system 6, i.e. it is verified that the first attachment member is attached to the second attachment member.

In response to verifying that the attachment members are engaged, activation of an object loading mode is enable in which the control system 16 generates a second set of operation instructions for the working equipment to move the loading arrangement (5) so that the object to load is loaded on the vehicle.

Above, one aspect of the present invention has been described that relates to a working equipment structured to be mounted on a vehicle. It should be noted that all embodiments disclosed above in relation to the vehicle are also applicable in relation to the working equipment.

In one embodiment of the working equipment the movable loading arrangement 5 is a hooklift loading arm, or a crane arm (with one or more booms), and wherein the first attachment member 7 comprises a hook, grip or fork.

And in a further embodiment of the working equipment, in order for the vehicle to reach the target position 22, the control unit is configured to identify an object for loading and estimate the position of the identified object in relation to the vehicle by comparing spatial features of objects in the captured set of image data to corresponding spatial features of an object for the vehicle to load according to said working task. The control unit is then configured to determine and generate a third set of operation instructions for moving the vehicle towards the estimated position of the detected object.

Figure 6:
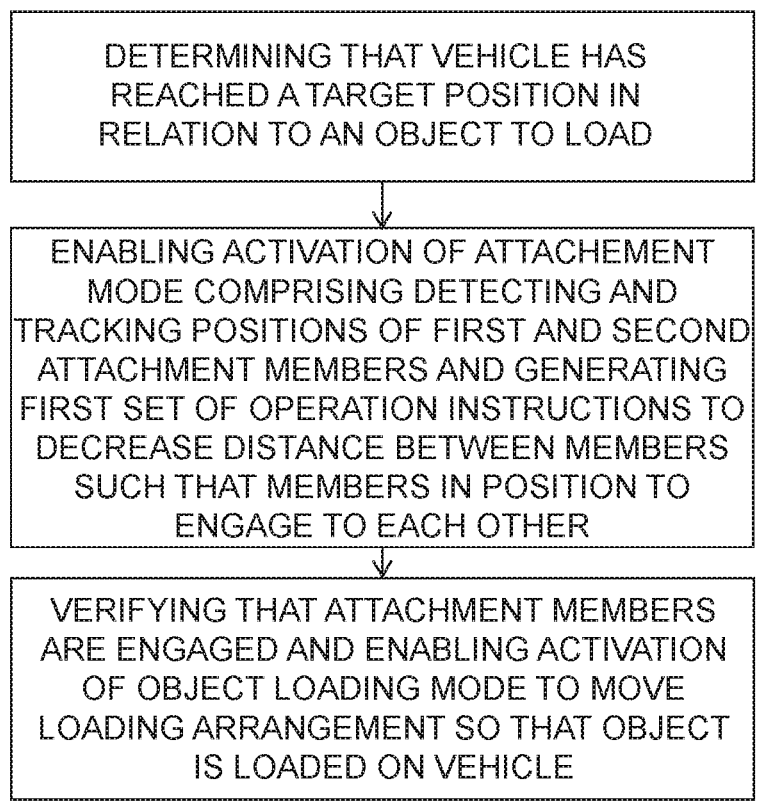
FIG. 6 is a flow diagram illustrating the method according to the present invention.

The present invention also relates to a method in relation to a vehicle comprising a working equipment, or to a method in relation to a working equipment structured to be mounted on a vehicle, said working equipment is equipped with a movable loading arrangement comprising a first attachment member. The method will be described below with references to the flow diagram shown in FIG. 6. The vehicle and working equipment has been described in detail above and it is herein also referred to that description. Thus, the vehicle, or working equipment, further comprises:
- a sensor system configured to capture environmental data reflecting the environment around the vehicle and/or the working equipment, and to determine, based on said data, image data representing an area at least partly surrounding the vehicle and/or the working equipment,
- a control unit configured to receive said image data, and said vehicle data, and to determine and generate control signals for controlling said vehicle, wherein said control signals comprise driving instructions,
- the control unit is configured to receive a working task to be performed by the vehicle, wherein said working task includes information of an object for the vehicle to load when performing said working task.

The method comprises:
- determining that the vehicle has reached a target position 22, being a position based on the location of the object 20 to load when performing said working task, using said image data representation from the sensor system,
- in response to determining that the vehicle has reached the target position enabling activation of an attachment mode of the working equipment comprising:
  - detecting and tracking positions of the first attachment member and a mating second attachment member of the object to load in said image data representation, and,
  - using the detected and tracked positions of the first and second attachment members are to generate a first set of operation instructions for the loading arrangement of the working equipment that decreases the distance between said first and second attachment members such that said attachment members come into position to engage to each other,
- verifying that said attachment members are engaged based on the detected and tracked positions from the sensor system,
- in response to verifying that said attachment members are engaged, enabling activation of an object loading mode comprising generating a second set of operation instructions for the working equipment to move the loading arrangement so that the object to load is loaded on the vehicle.

Preferably the method comprises detecting and tracking the position of the first attachment member in relation to said second attachment member in three dimensions by mapping sets of image data to a common three-dimensional coordinate system.

In order for the vehicle to reach the target position 22, the method, according to one embodiment, comprises identifying an object for loading and estimating the position of the identified object in relation to the vehicle by comparing spatial features of objects in the captured set of image data to corresponding spatial features of an object for the vehicle to load according to said working task, and determining and generating a third set of operation instructions for moving the vehicle towards the estimated position of the detected object. This embodiment is further discussed above in relation to the description of the vehicle.

The present invention is not limited to the above-described preferred embodiments. Various alternatives, modifications and equivalents may be used. Therefore, the above embodiments should not be taken as limiting the scope of the invention, which is defined by the appending claims.

The invention claimed is:

1. A vehicle comprising a working equipment equipped with a movable loading arrangement comprising a first attachment member, said vehicle further comprises:
    a sensor system configured to capture environmental data reflecting the environment around the vehicle and to determine, based on said data, image data representing an area at least partly surrounding the vehicle,
    a control unit configured to receive said image data, and to determine and generate control signals for controlling said vehicle, wherein said control signals comprise operation instructions for the vehicle and working equipment,
    the control unit is configured to receive a working task to be performed by the vehicle, wherein said working task includes information of an object for the vehicle to load when performing said working task,
    wherein said control unit is configured to:
    determine that the vehicle has reached a target position dependent upon the type of working equipment and being a position based on the location of the object to load when performing said working task, using said image data representation from the sensor system,
    in response to determining that the vehicle has reached the target position enable activation of an attachment mode of the working equipment in which:
    the sensor system is configured to detect and track positions of the first attachment member and a mating second attachment member of the object to load in said image data representation, and,
    the detected and tracked positions of the first and second attachment members are used to generate a first set of operation instructions for the loading arrangement of the working equipment that decreases the distance between said first and second attachment members such that said attachment members come into position to engage to each other,
    verify that said attachment members are engaged based on the detected and tracked positions from the sensor system,
    in response to verifying that said attachment members are engaged, enable activation of an object loading mode in which the control unit generates a second set of operation instructions for the working equipment to move the loading arrangement so that the object to load is loaded on the vehicle.

2. The vehicle according to claim 1, wherein said sensor system comprises a first and a second sensor unit placed on different locations on the working equipment and vehicle, and wherein image data from said first and the second sensor units is used to detect and track the position of said first attachment member in relation to said second attachment member in three dimensions by mapping sets of image data from the first and second sensor unit to a common three-dimensional coordinate system.

3. The vehicle according to claim 1, wherein said movable loading arrangement is a hooklift loading arm, or a crane arm with one or more booms, and wherein said first attachment member comprises a hook, grip or fork.

4. The vehicle according to claim 1, wherein said sensor system comprises one or many of radar, LIDAR, 3D cameras, cameras, lasers, thermal cameras, and wherein said image data being data organized in a matrix to describe the spatial relationship of the surrounding with respect to what said sensor system is measuring.

5. The vehicle according to claim 1, wherein in order for the vehicle to reach the target position the control unit is configured to identify an object for loading and estimate the position of the identified object in relation to the vehicle by comparing spatial features of objects in the captured set of image data to corresponding spatial features of an object for the vehicle to load according to said working task, wherein said control unit is then configured to determine and generate a third set of operation instructions for moving the vehicle towards the estimated position of the detected object.

6. The vehicle according to claim 5, further comprising a vehicle data unit configured to determine vehicle data representing characteristics of the vehicle, and that said control unit is also configured to receive said vehicle data, and wherein said vehicle data comprises one or many of the number of wheels in contact with the ground, the location of wheels in contact with the ground relative to the vehicle, the weight of the vehicle, the center of mass of the vehicle, and the type of tires, and wherein said vehicle data is applied to determine said third set of operation instructions.

7. A working equipment structured to be mounted on a vehicle and equipped with a movable loading arrangement comprising a first attachment member, said working equipment comprises:
  a sensor system configured to capture environmental data reflecting the environment around the working equipment and vehicle when mounted on the vehicle, and to determine, based on said data, image data representing an area at least partly surrounding the working equipment and the vehicle,
  a control unit configured to receive said image data, and to determine and generate control signals for controlling said vehicle and working equipment, wherein said control signals comprise operation instructions,
  the control unit is configured to receive a working task to be performed by the working equipment when mounted on said vehicle, wherein said working task includes information of an object for the vehicle to load when performing said working task,
  wherein said control unit is configured to:
  determine that the vehicle has reached a target position dependent upon the type of working equipment and being a position based on the location of the object to load when performing said working task, using said image data representation from the sensor system,
  in response to determining that the vehicle has reached the target position enable activation of an attachment mode of the working equipment in which:
the sensor system is configured to detect and track positions of the first attachment member and a mating second attachment member of the object to load in said image data representation, and,
the detected and tracked positions of the first and second attachment members are used to generate a first set of operation instructions for the loading arrangement of the working equipment that decreases the distance between said first and second attachment members such that said attachment members come into position to engage to each other,
  verify that said attachment members are engaged based on the detected and tracked positions from the sensor system,
  in response to verifying that said attachment members are engaged, enable activation of an object loading mode in which the control unit generates a second set of operation instructions for the working equipment to move the loading arrangement so that the object to load is loaded on the vehicle.

8. The working equipment according to claim 7, wherein said movable loading arrangement is a hooklift loading arm, or a crane arm with one or more booms, and wherein said first attachment member comprises a hook, grip or fork.

9. The working equipment according to claim 7, wherein said sensor system comprises one or many of radar, LIDAR, 3D cameras, cameras, lasers, thermal cameras, and wherein said image data being data organized in a matrix to describe the spatial relationship of the surrounding with respect to what said sensor system is measuring.

10. The working equipment according to claim 7, wherein in order for the vehicle to reach the target position the control unit is configured to identify an object for loading and estimate the position of the identified object in relation to the vehicle by comparing spatial features of objects in the captured set of image data to corresponding spatial features of an object for the vehicle to load according to said working task, wherein said control unit is then configured to determine and generate a third set of operation instructions for moving the vehicle towards the estimated position of the detected object.

11. A method in relation to a vehicle comprising a working equipment, or in relation to a working equipment structured to be mounted on a vehicle, said working equipment is equipped with a movable loading arrangement comprising a first attachment member, and that said vehicle or working equipment comprises:
  a sensor system configured to capture environmental data reflecting the environment around the vehicle and/or the working equipment, and to determine, based on said data, image data representing an area at least partly surrounding the vehicle and/or the working equipment,
  a control unit configured to receive said image data, and said vehicle data, and to determine and generate control signals for controlling said vehicle, wherein said control signals comprise driving instructions,
  the control unit is configured to receive a working task to be performed by the vehicle, wherein said working task includes information of an object for the vehicle to load when performing said working task,
  wherein said method comprises:
  determining that the vehicle has reached a target position dependent upon the type of working equipment and being a position based on the location of the object to load when performing said working task, using said image data representation from the sensor system,
  in response to determining that the vehicle has reached the target position enabling activation of an attachment mode of the working equipment comprising:
detecting and tracking positions of the first attachment member and a mating second attachment member of the object to load in said image data representation, and, using the detected and tracked positions of the first and second attachment members are to generate a first set of operation instructions for the loading arrangement of the working equipment that decreases the distance between said first and second attachment members such that said attachment members come into position to engage to each other, verifying that said attachment members are engaged based on the detected and tracked positions from the sensor system, in response to verifying that said attachment members are engaged, enabling activation of an object loading mode comprising generating a second set of operation instructions for the working equipment to move the loading arrangement so that the object to load is loaded on the vehicle.

12. The method according to claim 11, comprising detecting and tracking the position of said first attachment member in relation to said second attachment member in three dimensions by mapping sets of image data to a common three-dimensional coordinate system.

13. The method according to claim 11, wherein, in order for the vehicle to reach the target position, the method comprises identifying an object for loading and estimating the position of the identified object in relation to the vehicle by comparing spatial features of objects in the captured set of image data to corresponding spatial features of an object for the vehicle to load according to said working task, and determining and generating a third set of operation instructions for moving the vehicle towards the estimated position of the detected object.

* * * * *